June 25, 1968 F. KLAWSNIK ET AL 3,390,333

PARALLEL AMPLIFIERS WITH INPUT AND OUTPUT COUPLING BY MEANS OF CLOSELY-PACKED, ELECTRICALLY SMALL INPUT AND OUTPUT RADIATORS

Filed Oct. 29, 1965 2 Sheets-Sheet 1

INVENTORS
FRANK KLAWSNIK &
WILLARD T. PATTON

BY Edward J. Norton
Attorney

INVENTORS
FRANK KLAWSNIK &
WILLARD T. PATTON
BY Edward J. Norton
Attorney

United States Patent Office 3,390,333

Patented June 25, 1968

3,390,333

PARALLEL AMPLIFIERS WITH INPUT AND OUTPUT COUPLING BY MEANS OF CLOSELY-PACKED, ELECTRICALLY SMALL INPUT AND OUTPUT RADIATORS

Frank Klawsnik, Haddonfield, and Willard Thomas Patton, Moorestown, N.J., assignors to Radio Corporation of America, a corporation of Delaware Filed Oct. 29, 1965, Ser. No. 505,676

8 Claims. (Cl. 325—14)

ABSTRACT OF THE DISCLOSURE

A plurality of active devices are individually positioned between an input and output metallic plate. Each of these active devices has an individual input and output radiator. The radiators are surrounded by an area of a given height and width of the respective metallic plates. An electromagnetic wave is launched with its Poynting vector in the direction of the input radiators. The ratio of the height and width of the areas of the plates surrounding each radiator is made so that both the input impedance and the output impedance of the active devices are matched by the effective input and output impedance provided by the metallic plates. The complete area behaves substantially resistive even though each individual area has a height and width substantially less than one-half a wave length at the operating frequency and would by itself be highly reactive.

This invention relates to high power devices and more particularly to a method of obtaining high power at high frequency and to an improved apparatus using that method.

The problem of obtaining high power at high frequencies has been explored in the prior art using various techniques. One such technique parallels relatively low power active devices, for example, amplifiers, by physically connecting their inputs to a single source or equivalent structure and by physically connecting their outputs together. This method as previously employed gives high power but has disadvantages among which is the fact that the active devices involved interact on one another causing each device to generate unequal amounts of power. Another disadvantage is that by paralleling the active devices with their outputs connected together, if one device which is dissipating more power than the other shorts out, then this short adversely affects the complete circuit. The latter problem is partially solved by using complex paralleling of the active devices with circulators and similar circuit elements. In addition to the extra circuit elements required, such an arrangement is difficult and expensive to fabricate.

Components, for example, transistors, tubes, varactors, tunnel diodes, and so on, are constantly being engineered to obtain higher and higher power output. But the need for high power output devices and particularly solid state devices still exists, and this need is increasing at a more rapid rate than the development of such high power devices. The problems are particularly significant at high frequency because of the restricted amount of power obtainable from active devices in the high frequency end of the spectrum.

It is therefore an object of this invention to provide an improved high frequency, high power device.

A further object is to provide an improved high frequency, high power device of the type employing parallel arranged active devices.

A further object is to provide an improved arrangement by which a plurality of active devices can be operated in parallel without requiring their inputs or their outputs to be physically connected together.

Still a further object is to provide an improved method for obtaining high power at high frequency.

Still another object is to provide an improved high frequency, high power device which is easy to fabricate.

These and other objects are achieved in one embodiment of the invention by launching an electromagnetic wave having a Poynting vector in a desired direction. A plurality of active devices, for example amplifiers, are individually mounted between an input and output metallic plate. Each active device has an individual input and output radiator. These radiators are each bounded by an area of height $h$ and width $w$ on the respective input and output plates. The dimensions of this bounding area for each radiator are determined so that an electromagnetic wave directed toward the input radiators excites the input radiators in phase. The active devices, assumed above to be amplifiers, are each driven from an input radiator to amplify the received wave, the output radiators collectively radiating the amplified wave, thereby, obtaining high power operations. A feature of the invention is that the active devices are paralleled in space, eliminating physical connections between their inputs or outputs and avoiding the problems encountered when such physical connections must be provided.

In order that the invention may be more clearly understood, it will be described in detail with reference to the accompanying figures in which.

Figures 1, 2:
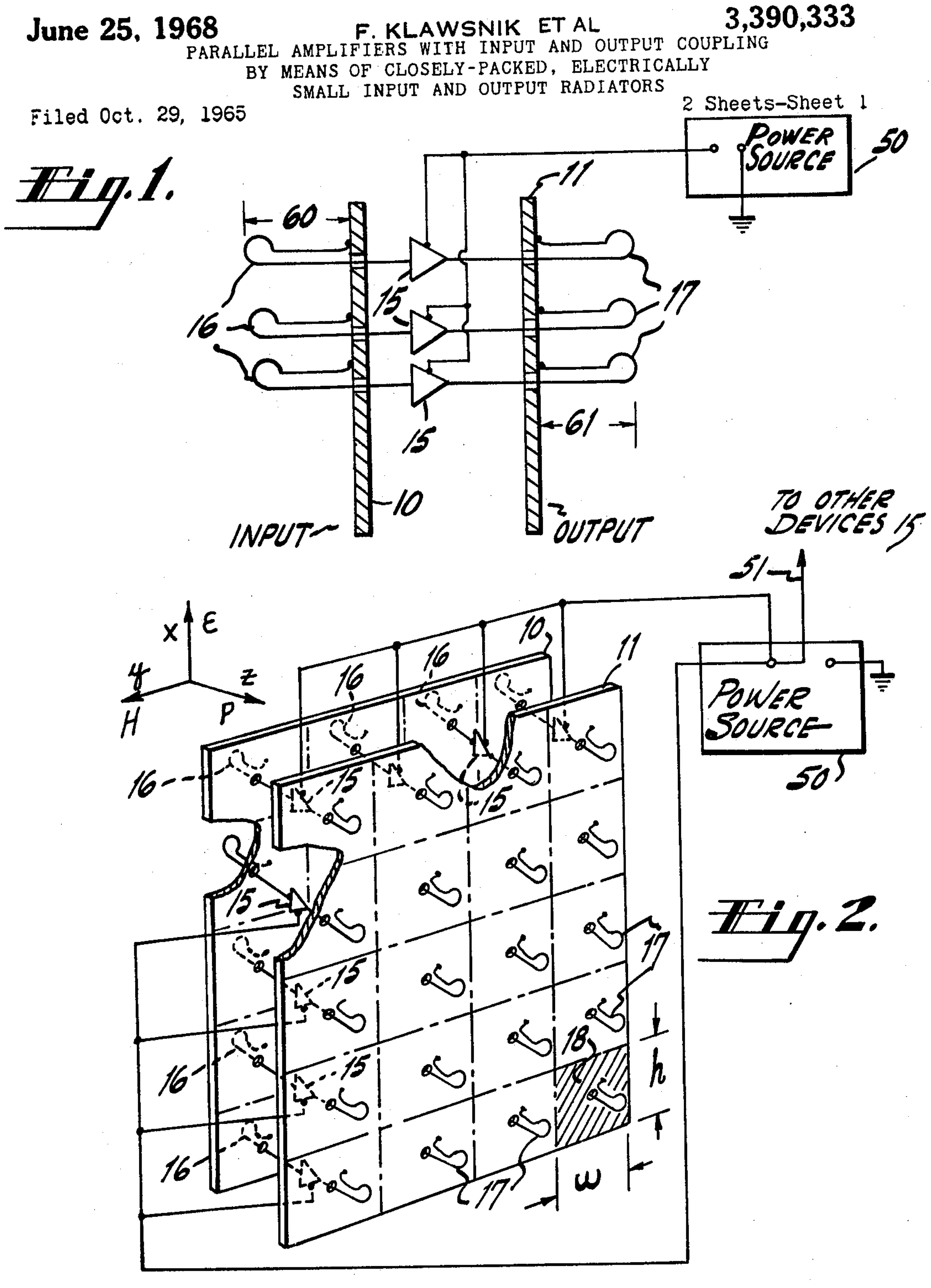
FIGURE 1 is a transverse diagrammatic view of one embodiment of a high power device according to the invention.
FIGURE 2 is a diagrammatic view of another embodiment of a high power device according to this invention.

Referring to FIGURE 1, there is shown two panels or plates referenced as 10 and 11. The panels 10 and 11 are separated by a finite distance. The finite distance between panels 10 and 11 is not critical and need only be great enough to accommodate an active device 15 and its associated components between the two panels 10 and 11. The distance between panels 10 and 11 is, then, a function of the physical size of the circuit associated with an active device 15, which may be a conventional amplifier, frequency multiplier or other active circuit.

The panels 10 and 11 are preferably fabricated from a good conducting metal such as copper, silver or aluminum. Each active device 15 is supplied with proper operating potentials from a power source 50. One terminal of the power supply 50 is shown at ground or a reference potential and this potential is applied to a common point of all the active devices 15. Such connections have not been shown in FIG. 1 to avoid unnecessary confusion in the drawing and will be supplied following known techniques. An input terminal of each active device 15 is coupled to a small antenna or radiator element 16 by a suitable wire connection which passes through the input panel 10 and is insulated from the panel 10. The other terminal of the radiators 16 are each connected to the input plate 10. Radiator 16 is shown as a loop configuration but it could be of the helical, turnstile, fork, rod, slot or of any known type. The requirement for radiator 16 is that it be capable of picking up or responding to electromagnetic radiation in the vicinity of the input plate 10. The radiators 16 are, by way of example only, composed of a conducting metal such as copper or aluminum. The radiators 16 are made of an effective length substantially less than a wavelength at the frequency of the electromagnetic radiation to be received thereby. The radiators are dimensioned to have a length 60 between 1/10 to 1/100 of the electromagnetic wavelength as measured from the face of plate 10 to the outermost point of the radiator 16.

The devices 15 each have a terminal of an output radiator 17 connected to their output terminal. The output lead for each device 15 passes through the plate 11 and is insulated from the plate by conventional techniques. The other terminal of the radiator 17 is connected to the output plate 11. The length 61 of the radiators 17 taken between the output plate 11 and the outermost point of the radiator 17 is as in the case of radiators 16 made a substantially small fraction of the electromagnetic wave length to be radiated. If the active devices 15 are amplifier circuits the input and output radiators 16 and 17, respectively, are the same length. If the active devices 15 are frequency multipliers, the input radiators 16 are dimensioned to be a fraction of a wavelength of the input electromagnetic wave and the output radiators 17 are dimensioned to be a fraction of the wavelength of the multiplied electromagnetic wave's wavelength. While the radiators 17 are shown as having a loop configuration, the radiators 17, like radiators 16, are not confined to the illustrated loop configurations.

Reference is now made to the embodiment of the invention shown in FIGURE 2. There is shown two panels in perspective referenced as 10 and 11. The panels are composed of a conducting material and are identically referenced as those of FIGURE 1 for clarity. The panels 10 and 11 are made of a metallic material such as copper or aluminum. Panels 10, 11 are shown separated into discrete areas by a series of dashed vertical and horizontal lines. The areas delineated by the dashed lines are of the same size, one of the areas 18 on panel 11 being indicated by cross-hatching. The vertical and horizontal lines are included in the figure only for purposes of explanation and do not appear on the completed structure. The distance between the input panel 10 and output panel 11 as before need only be great enough to accommodate an active device 15 and its associated components. The plurality of active devices 15 supported by suitable means, not shown, between the two panels 10 and 11, are shown in block form, as techniques for designing such devices 15, are known in the art and are not per se part of this invention. The devices 15 may be, by way of example, tube, transistor, tunnel diode or varactor amplifiers singly or in combination. For the sake of simplicity, the devices 15 are given the same numerical designation and are shown only in the visible portion between panels 10 and 11.

A terminal of a separate pickup or radiator element 16 is connected to the input side of each active device 15. The other terminal of the radiator 16 is connected to the input plate 10, as shown in FIGURE 1. The effective length of radiator 16 is made one tenth or one-one hundredth of a wavelength at the frequency to be amplified. This dimension is taken from the outer most point of the radiator 16 to the face of plate 10, as was previously described for FIGURE 1. Connected to the opposite end or the output of the active devices 15 are output radiators 17, which can be the same length and configuraion as elements 16. The output radiators 17 are connected to the outputs of the active devices 15 in the same manner as shown and described in connection with FIGURE 1.

Shown also in FIGURE 2 at the upper left hand corner of the figure are the X, Y, Z axes of an electromagnetic wave, where the respective axes are labelled H, E, and P. H is the magnetic field vector, E is the electric field vector and P is the Poynting vector. This is a conventional representation of a plane or TEM wave. The TEM wave (Transverse Electric & Magnetic) propagates in the direction of the Z axis or in this case in the direction of P which is the Poynting vector, the TEM wave is intercepted by the metal panel 10 and the input radiators 16. Because of the wave characteristics of the plane wave or TEM wave, it propagates with a plane constant phase front and will excite the array of input radiators 16 uniformly in phase. Normally a radiator or a small antenna element has to be substantially a half of a wavelength to behave as a resistnce, in order to efficiently pickup or radiate power. However the use of the array of devices 16 in the shown configuration negates this restriction, as will be explained.

Considering the cross-hatched area 18 shown on the lower right hand corner of panel 11, the area 18 like the other similar areas on panels 10 and 11 has a height $h$ and width $w$. It is to be understood that there is an area similar to and opposite area 18 on the input plate 10 which is not visible in the figure. The height and width of area 18 and of the corresponding area on plate 10, which bound the output and input radiators 17 and 16, respectively, for the device 15 positioned between the area 18 and the corresponding area on panel 10, are chosen to present a certain impedance to that active device 15, whereby this impedance as provided by the bounding areas on plates 10, 11 matches the input and output impedance of the device 15. Both $h$ and $w$ can be made substantially small (for example 1/10 to 1/100 of a wavelength at the operating frequency) compared to the wavelength of the applied TEM wave. This is so because it is the ratio of $h$ to $w$ that determines the magnitude of the impedance. Hence $h$ and $w$ need only be large enough to accommodate the active device 15 and its associated components, while the ratio $h/w$ is kept at a desired value. The unit area 18 composed of metal presents an impedance to an electromagnetic wave equal to $$Z=Nh/w \qquad (1)$$

$Z$=unit impedance of area 18 (ohms)
$N$=wave impedance in free space=377 ohms
$h$=height of area 18
$w$=width of area 18

Thusly, the input panel 10 is considered as separated into a plurality of areas similar in size to area 18 with each area including an input radiator element 16. Each of the radiator elements 16 will, taken with the bounding area of panel 10 have a radiation impedance in accordanre with the above formula. If the respective areas bounding the radiator 16 are dimensioned according to Equation 1 the impedance of each area can be selected so that there is a maximum power transfer from the radiator 16 via the plate 10 to the input of the active device 15. Hence each radiator 16 in conjunction with the area of the plate 10 bounding that radiator 16 serves as a transformer and allows the electromagnetic wave's energy to distribute itself to the plurality of the active devices 15. By placing the input radiators 16 at closely spaced intervals while maintaining the impedance relation dictated by Equation 1 the complete array behaves substantially resistive, even though each individual radiator 16, being much less than one half of a wavelength, by itself would be highly reactive. As was mentioned in conjunction with FIGURE 1 one terminal of the radiator is connected to the metal plate enabling it to pick up the energy in the associated area and feed it to the active device's 15 input. Thus the effective resistive impedance of the array will cause the TEM wave or plane wave to efficiently excite such individual input radiator 16 uniformly in phase. The signal wave picked up on the radiators 16 is fed via the radiator to the input terminals of the respective active devices 15 each of which amplifies the wave. Panel 11 is of the same construction as panel 10 such that the amplified wave supplied by the active devices 15 is radiated by the output radiators 17 correspondingly in phase. The output radiators 17 cause an amplified TEM wave or plane wave to propagate. This wave can be collected by a suitable transmission medium such as a waveguide or otherwise utilized.

The active devices 15, instead of taking the form of amplifiers, may be frequency multipliers and hence a plane wave of frequency $f$ can be launched towards the input plate 10, exciting the radiators 16. The multipliers 15 are driven in a manner to cause the output radiators 17 to emit radiation at $Nf$ (where N is the multiplying integer). In this case the length of the output radiators 17 will be a fraction of the output wavelength according to $$L=Kc/Nf \quad (2)$$

$L$=length of output radiators 17 (meters)
$K$=fraction less than ½
$N$=multiplication integer
$c$=velocity of light in free space $\cong 3\times 10^8$ m./sec.
$f$=input frequency (cycles/second)

It is to be noted that there is no physical connection for signal energy between either the inputs or the outputs of the active devices 15. The only common connection to the devices 15 is from a suitable power source 50 to provide proper biasing and operating potentials for the active devices 15. A lead 51 from the power source 50 is indicated as going to the other active devices 15, not shown, for simplicity. Hence if one device 15 fails the others continue to operate unaffected by this failure. While such means are not shown in the embodiment of FIG. 2, any suitable transmission medium including free space which encloses the assembly of plates 10 and 11, the active devices 15 and the source of electromagnetic wave energy may be provided. If the power gain from input to output for one active device 15 together with the efficiency of the radiators 16 and 17 is A, the output from the total array is given by:

$$P_o=XAP_i \quad (3)$$

$P_o$=power output of total array (watts)
$X$=number of active devices in the array
$A$=power gain of individual active device as defined above
$P_i$=power at the input (watts)

Because of the relatively small area involved as represented by the height $h$ and width $w$ of area 18 having height $h$ and width $w$ on the order of ¹⁄₁₀ to ¹⁄₁₀₀ of a wavelength the packing density is high and this affords for a given size of the array a substantial increase in the output power. Since the corresponding spacing between the individual radiators is so small (¹⁄₁₀ to ¹⁄₁₀₀ of a wavelength) there will also be no grating lobe.

Figure 3:
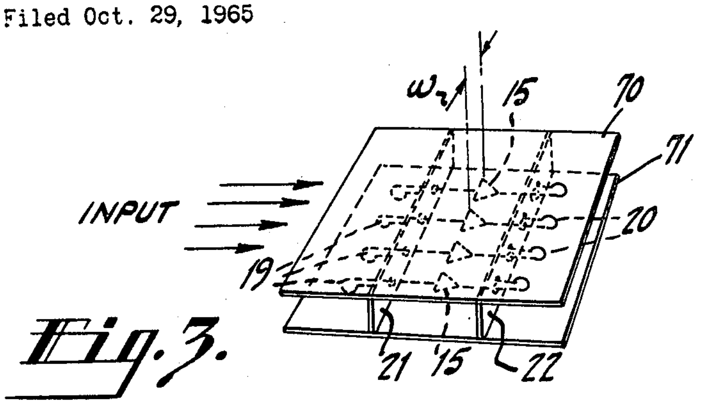
FIGURE 3 is a diagrammatic view of another embodiment of a high power device according to this invention.

Referring to FIGURE 3 there is shown a further embodiment of the invention. Plates 70 and 71 form a parallel plate transmission line. Therein is shown four active devices 15 as defined above. Each device has an input input radiator shown as 19 and 20 respectively. The length of these radiators are chosen to be a small multiple of the input wavelength as stated previously. The active devices 15 are spaced a distance $w$ away from one another and the height of the individual supporting panels 21 and 22 is $h$. Therefore each active device 15 is located within an area of height $h$ and width $w$. The impedance of this area together with the radiator is determined from Equation 1. The panels 21 and 22 are preferably fabricated from metallic material as previously mentioned in conjunction with plates 10 and 11 of FIGURE 1. Hence Equation 1 determines the radiation impedance, and active devices 15 will be operated in a manner similar to that explained above.

Figures 4, 5:
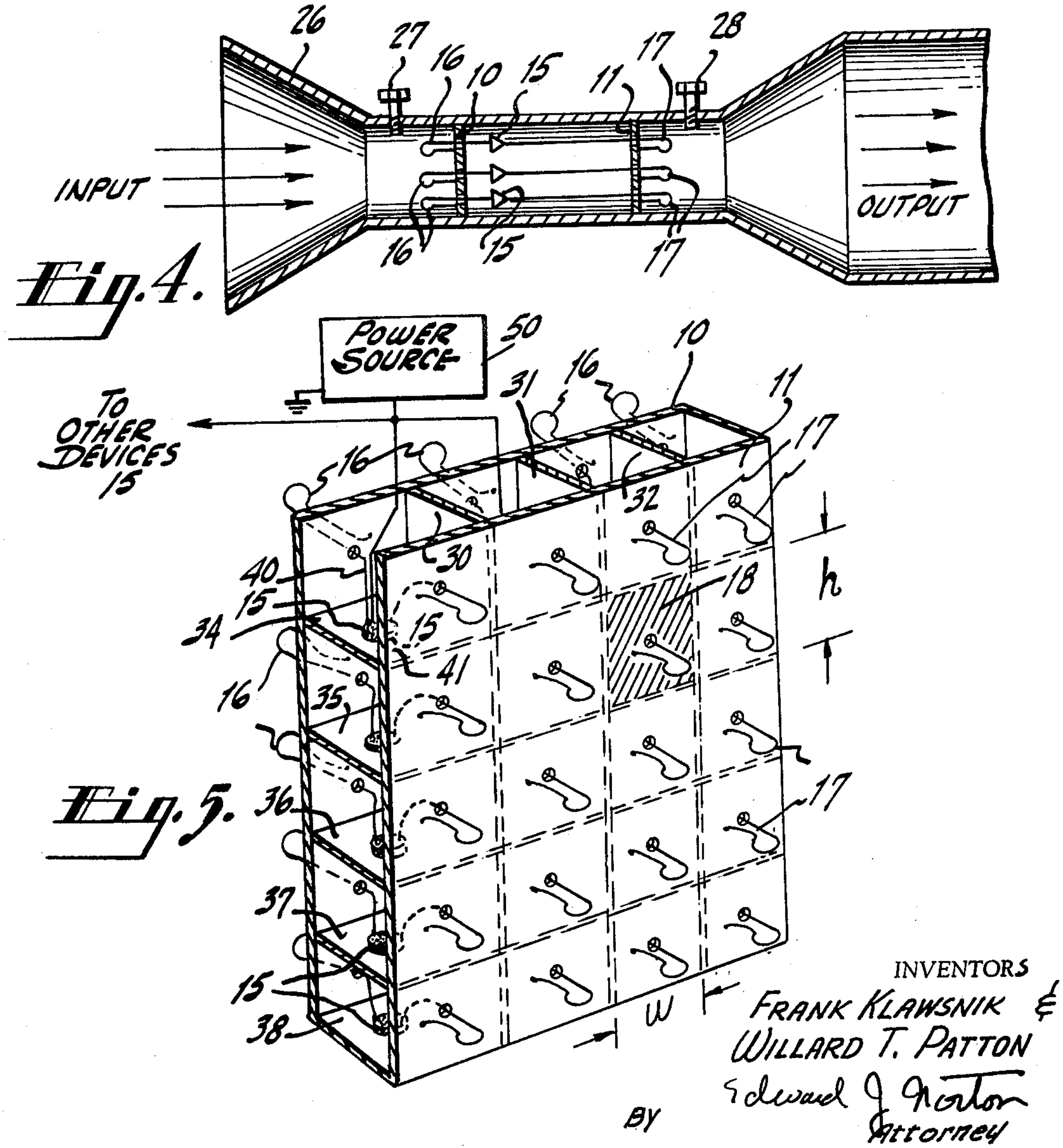
FIGURE 4 shows a transverse sectional view of a further embodiment of a high power device according to this invention.
FIGURE 5 is a diagrammatic view of still another embodiment of a high power device according to this invention.

FIGURE 4 shows a high power amplifier according to this invention. Elements similar to those previously described are given like numerals for simplicity. There is shown a waveguide 26 having an input end flared so that it takes the shape of what is commonly referred to as a horn waveguide or horn antenna. The horned input portion of waveguide 26 is designed to accommodate a TE, transverse electric wave, or plane wave at the frequency to be amplified. It is to be noted that a TE wave also possesses a Poynting vector whose direction can be controlled. The TE wave enters the waveguide 26 via the input end and propagates to a rectangular portion of the waveguide 26. In this section a tuning screw 27 is shown which further helps to select the input frequency. Other means for tuning such as one-quarter wavelength plates or filters might be used to select the input frequency. In the rectangular section of the waveguide 26, an array of active devices 15 positioned between panels 10, 11 in a configuration similar to that of FIGURE 1 is shown. While not shown in FIG. 4, it is to be understood that suitable power supply means for the devices 15 as shown in FIG. 1 is provided. The input radiators 16 pick up the TE wave and cause it to be amplified frequency multiplied or otherwise transformed, as the case may be, depending on the circuit configuration of the active devices 15. The processed wave is radiated by elements 17. The energy radiated by output radiators 17 is further filtered by means of tuning element 28 and collected by the output end, which is of a horn like shape similar to the input end. This output power can now be coupled to another waveguide or transmission path and utilized.

FIGURE 5 shows an array arrangement similar to that of FIGURE 1 except that a compartmentized configuration is used. The arrangement of FIG. 5 particularly lends itself to integrated circuit techniques. Plates 30 to 33 are spaced in the vertical and plates 34 to 38 are spaced in the horizontal between the two panels 10, 11. The plates 30 to 33 intersect the plates 34 to 38 at right angles and form a plurality of compartments or grid like structure between panels 10 and 11. The width of the vertical plates 30 to 33 and the width of the horizontal plates 34 to 38 are determined so that the active devices 15 and associated components can be easily mounted within the compartments so formed. Vertical plate 38 and horizontal plate 33 serve to enclose the structure at the bottom and right side respectively. Two other plates similar to plates 38 and 34 can be used to enclose the grid like structure on the top and left sides respectively. Such plates are omitted in order to show the configuration without an excess of hidden lines. Hence what is described in a structure of generally rectangular configuration composed of a plurality of compartments. Each compartment has at the face of the panels 10, 11 a height, $h$, width $w$ chosen to satisfy Equation 1 above. Assume that the horizontal plates 34 to 38 are made of a substrate material such as silicon, germanium or other suitable material. The active devices 15 can then be deposited at correct intervals along the plates 34 to 38 using known integrated circuit techniques. A single active device is in this manner formed in each compartment of the assembly. The vertical plates 30 to 32 can be provided for support or for isolation and shielding between the devices 15. The plates 30 to 32 can be made of a metal properly insulated from the panels 10, 11 or may be made of a suitable insulating material. Input radiating elements 16 and output radiating elements 17 are connected to the devices 15 using microwave strip line or other suitable connection techniques. Each radiator 16 and 17 is bounded by an area corresponding to the cross-hatched area 18 discused above in connection with FIG. 2. The operation of the assembly of FIG. 5 will be as previously described. By the use of the minimization techniques possible in the construction of the arrangement of FIG. 5, greatly increased packing density is obtainable. Since more devices 15 can be used in a given size of the assembly, higher power outputs are possible for that size of the assembly as compared to the case when the more standard circuit and component construction techniques are used for the devices 15.

A particular application of the invention of interest is its use as an amplifying antenna. By way of example, a source of signal energy which is to be radiated into free space can be arranged to propagate the signal energy as a spherical wave along a dielectrically loaded waveguide. A suitable lense system connects the spherical wave to a plane wave. The plate wave is then directed toward the panel 10 and input radiators 16. The active devices 15 acting as signal amplifiers amplify the received signal energy, the output radiators being generated to collectively radiate the amplified signal energy into free space. When desired, conventional phasing techniques can be used in the operation of the devices 15 to provide a phased array or steerable antenna. In a further embodiment, the input radiators 16 can be arranged so as to be excited from the field distribution pattern in a high order mode cavity. Also, while the operation of devices 15 as amplifiers or frequency multipliers has been specifically mentioned, the devices may be of a type to perform any one of a wide range of functions, for example, phase shifting, frequency shifting, frequency mixing, and so on.

What is claimed is:

1. An apparatus for processing a TEM wave comprising, in combination, (a) an input plate defined by a plurality of first areas of height *h* and width *w*, where the length of *h* and *w* are substantially less than one-half of said TEM wave's wavelength, (b) an output plate parallel to said input plate and defined by a plurality of second areas of height *h'* and width *w'*, where the lengths of *h'* and *w'* are substantially less than one half of said TEM wave's wavelength;

(c) a plurality of input radiators each of which is positioned such that it is bounded singularly by one of said first areas, said first plurality of radiators each having two terminals, (d) a plurality of output radiators each of which is positioned such that it is bounded singularly by one of said second areas, said second plurality of radiators each having two terminals, (e) a plurality of active devices each having an input and output terminal and positioned between said input and output plates, (f) means for individually coupling one terminal of each of said input radiators to said input terminal of one of aid active devices whereby each one of said active devices is independently coupled over a separate path to one of said input radiators, (g) means for individually coupling one terminal of each of said output radiators to said output terminal of one of said active devices whereby each one of said active devices is independently coupled over a separate path to one of said output radiators, (h) said other terminal of said input and output radiators being coupled respectively to said input and output plates, (i) means for launching and causing said TEM wave to propagate in the direction of said input plate to cause said input radiators to couple said wave to said active devices, (j) said plurality of output radiators being arranged to collectively radiate the output of said active devices as a single wave.

2. Apparatus for processing an electromagnetic wave comprising, (a) a metal input plate defined by a first plurality of areas of height *h* and width *w*, where the lengths *h* and *w* are substantially less than one-half of said electromagnetic waves' wavelength, (b) a metal output plate substantially parallel to said input plate and defined by a second plurality of areas of height *h'* and width *w'*, where the lengths of *h'* and *w'* are substantially less than one-half of said electromagnetic wave's wavelength, (c) a plurality of active circuits positioned between said input and output plates, each having an input and output terminal, (d) a plurality of input radiators each having two terminals, each of said radiators being located individually within one of said first areas with one terminal thereof coupled solely to the input terminal of a single one of said active circuits and the other terminal thereof coupled to said input plate, (e) a plurality of output radiators each having two terminals, each of said output radiators being located individually within one of said second areas with one terminal thereof coupled solely to the output terminal of a single one of said active circuits and the other terminal thereof coupled to said output plate, (f) said input and output radiators having a length *l*, measured respectively from said input and output plates to said radiators outermost point, where the effective length *l* is substantially less than one-half of said electromagnetic wave's wavelength, (g) means for directing said electromagnetic wave towards said input radiators, said input radiators taken with said first areas presenting a matching resistive impedance by which said wave is coupled to said active circuits, (h) said output radiators taken with said second areas presenting a matching resistive impedance by which the outputs of said active devices are collectively radiated as a single wave.

3. Apparatus for processing an electromagnetic wave comprising, in combination, (a) a metal input plate defined by a first plurality of areas of height *h* and width *w*, where the length of *h* and *w* are substantially less than one-half of said electromagnetic wave's wavelength, (b) a plurality of vertical plates arranged at right angles to said input plate and substantially parallel to one another, (c) a plurality of horizontal plates of the same width as said vertical plates arranged at right angles to said input plate and substantially parallel to one another, (d) a metal output plate defined by a second plurality of areas of height *h'* and width *w'*, where the lengths of *h'* and *w'* are substantially less than one-half of said electromagnetic wave's wavelength, said output plate being positioned parallel to said input plate and perpendicular to said vertical and horizontal plates, whereby said input plate, vertical and horizontal plates and said output plate form an array of compartments, (e) an active circuit disposed within each of said compartments having an input and output terminal within each of said compartments, (f) means for supplying operating potentials to said active circuits, (g) a plurality of input radiators each having two terminals, each individual input radiator being located by itself within one of said first areas of said input plate with one terminal thereof coupled solely to the input terminal of a single one of said active circuits and the other terminal thereof coupled to said input plate, (h) a plurality of output radiators each having two terminals, each individual output radiator being located by itself within one of said second areas of said output plate with one terminal thereof coupled solely to the output terminal of a single one of said active circuits and the other terminal thereof coupled to said output plate, (i) means for launching an electromagnetic wave towards said input radiators so that said input radiators in conjunction with said first plurality of areas act to couple said wave to said input terminals of said active circuits, (j) said output radiators in conjunction with said second plurality of areas operating to radiate the outputs of said circuits collectively as a single wave.

4. Apparatus for processing an electromagnetic wave comprising, in combination, (a) a metal input plate defined by a plurality of areas of height $h$ and width $w$, where $h$ and $w$ are substantially small compared to said electromagnetic wave's wavelength and where the rato of $h$ to $w$ is chosen so that said first area has an effective impedance according to the following relation:

$$Z=nh_n/w_n$$

$Z$=effective impedance of said area (ohms)
$n$=impedance of free space (ohms)
$h_n$=height of area (meters)=$h$ for said input areas
$w_n$=width of area (meters)=$w$ for said input areas (b) a metal output plate defined by a plurality of second areas of height $h_1$ and width $w_1$, where $h_1$ and $w_1$ are substantially small compared to said electromagnetic wave's wavelength and where the ratio of $h_1$ to $w_1$ is chosen so that said second area has an effective impedance according to the above relation where $h_1$ is substituted for $h_n$ and $w_1$ is substituted for $w_n$, (c) a plurality of active circuits positioned between said input and output plates, each of said circuits having an input terminal and an output terminal, (d) a separate input radiator having two terminals located within and bounded by each of said input areas with one terminal thereof coupled solely to the input terminal of a single one of said active circuits and the other terminal thereof coupled to said input plate, (e) said input radiator being of a length substantially smaller than said electromagnetic wave's wavelength whereby said radiator would by itself normally have a reactive impedance, (f) a separate output radiator having two terminals located within and bounded by each of said output areas with one terminal thereof being coupled solely to the output terminal of a single one of said active circuits and the other terminal thereof coupled to said output plate, (g) said output radiator being of a length substantially smaller than said electromagnetic wave's wavelength whereby said radiator would by itself normally have a reactive impedance, (h) means for launching and directing said electromagnetic wave towards said input radiators and said first areas, said input radiators and said input areas presenting by said relation a matching resistive impedance by which said wave is coupled in phase to said active circuits, (i) said output radiators in conjunction with said second areas presenting by said relation a matching resistive impedance to the outputs of said active devices by which said radiators act to collectively radiate the output of said active devices as a single in phase wave.

5. Apparatus for processing an electromagnetic wave comprising, (a) a metal plate defined by a plurality of areas of height $h$ and width $w$ where $h$ and $w$ are small compared to said electromagnetic wave's wavelength, (b) a plurality of radiators each of which is positioned to be bounded singularly by one of said areas, said plurality of radiators each having two terminals one of which is coupled to said metal plate, (c) a plurality of active circuits each having an input and output terminal, (d) means coupling each of said input terminals singularly to the other terminal of one said radiators, (e) said areas being dimensioned so that each area with the radiator bounded by that area presents a resistive impedance to said wave which matches the input impedance of the active circuit coupled at its input terminal to said last-mentioned radiator, (f) means by which said electromagnetic wave can be launched with its Poynting vector in the direction of said plate to cause said radiators to couple said wave to said active circuits, (g) means for applying operating potentials to said circuits, (h) means coupled to said active circuits output terminals to collectively radiate the outputs of said circuits as a single wave.

6. Apparatus as claimed in claim 5 wherein the ratio of $h$ to $w$ is chosen so that each of said areas has an effective impedance according to the following relation:

$$Z=nh/w$$

where
$Z$=effective impedance of said area in ohms
$n$=impedance of free space≅377 ohms
$h$=height of area (meters)
$w$=width of area (meters).

7. Apparatus for process an electromagnetic wave comprising, (a) a plurality of active circuits each having an input and output terminal, (b) means for applying operating potentials to said active circuits, (c) means for coupling an electromagnetic wave to said input terminals, (d) a metal plate defined by a plurality of areas of height $h$ and width $w$ where $h$ and $w$ are small compared to said electromagnetic wave's wavelength, (e) a plurality of radiators each of which is positioned to be bounded singularly by one of said areas, said plurality of radiators each having two terminals one of which is coupled to said metal plate, (f) means coupling each of said output terminals individually to the other terminal of one of said radiators whereby each active circuit has only on radiator coupled to its output, (g) said areas being dimensioned so that each area with the radiator bounded by that area presents a resistive impedance which matches the output impedance of the active circuit coupled at its output terminal to said last-mentioned radiator, (h) said plurality of radiators being operated to collectively radiate the outputs of said active circuits as a single wave.

8. An apparatus according to claim 7 wherein the ratio of $h$ to $w$ is chosen so that each of said areas has an effective resistive impedance according to the following relation;

$$Z=nh/w$$

$Z$=effective impedance of said area in ohms
$n$=impedance of free space≅377 ohms
$h$=height of area (meters)
$w$=width of area (meters).

References Cited

UNITED STATES PATENTS

| | | | |
|---|---|---|---|
| 2,129,712 | 9/1938 | Southworth | 330—53 X |
| 2,375,223 | 5/1945 | Hansen et al. | 330—53 X |
| 2,745,910 | 5/1956 | Dehn | 330—56 |
| 2,963,577 | 12/1960 | Errichiello et al. | 325—357 X |
| 3,245,081 | 5/1966 | McFarland | 343—854 X |
| 3,273,151 | 9/1966 | Cutler et al. | 343—100 |

ROBERT L. GRIFFIN, *Primary Examiner.*

JOHN W. CALDWELL, *Examiner.*

B. V. SAFOUREK, *Assistant Examiner.*